United States Patent [19]

Abraham et al.

[11] 4,452,777

[45] Jun. 5, 1984

[54] ELECTROCHEMICAL CELLS

[75] Inventors: Kuzhikalail M. Abraham, Needham Heights; Martin W. Rupich, Framingham, both of Mass.

[73] Assignee: EIC Laboratories, Inc., Norwood, Mass.

[21] Appl. No.: 371,555

[22] Filed: Apr. 26, 1982

Related U.S. Application Data

[63] Continuation-in-part of Ser. No. 277,709, Jun. 26, 1981, abandoned.

[51] Int. Cl.$^3$ .............................................. H01M 4/36
[52] U.S. Cl. .................................... 429/104; 429/103; 429/105; 429/191; 429/218
[58] Field of Search ............... 429/104, 105, 218, 101, 429/103, 191

[56] References Cited

U.S. PATENT DOCUMENTS

| | | | |
|---|---|---|---|
| 3,404,036 | 10/1968 | Kummer et al. | 136/6 |
| 3,877,984 | 4/1975 | Werth | 136/6 |
| 4,063,005 | 12/1977 | Mamantov et al. | 429/103 |
| 4,287,268 | 9/1981 | Coetzer | 429/103 |

OTHER PUBLICATIONS

Auborn et al. (1980), Proc. 15th IECE Conference, 575.
Newman et al. (1980), J. Electrochem. Soc., 127, 2097.
Abraham et al. (1980), J. Electrochem. Soc., 127, 2545.
Tomczuk et al. (1980), J. Electrochem. Soc. 127, 1881.
Vissers et al. (1974), J. Electrochem. Soc. 121, 665.
Steunenberg et al., Proc. Electrode Materials and Processes for Energy Conversion and Storage, J. D. E. McIntyre and S. Srinivasan Eds., The Electrochemical Society, Princeton, NJ, (1977).

*Primary Examiner*—Charles F. LeFevour

[57] ABSTRACT

An electrochemical cell having a housing containing a sodium anode assembly, a cathode assembly, and an electrolyte, in which the electrolyte is a sodium ion conducting alkali metal aluminum tetrahalide and the cathode material is a transition metal chalcogenide, or a reaction product of the chalcogenide and the electrolyte, disposed on a substrate in contact with the electrolyte.

10 Claims, 3 Drawing Figures

ELECTROCHEMICAL CELLS

BACKGROUND OF THE INVENTION

The government has rights to this invention pursuant to Contract NAS3-21726 from the National Aeronautics and Space Administration.

This application is a continuation-in-part of Abraham et al. Ser. No. 277,709, filed on June 26, 1981 now abandoned.

This invention relates to rechargeable electrochemical cells of the type having a liquid sodium (Na) anode separated from the cathode, which is in contact with a molten sodium tetrahalide electrolyte, by a Na+ ion conductor.

Various cathode and electrolyte materials have been used in such cells. Examples are: Kummer et al. U.S. Pat. No. 3,404,036 (sulfur cathode and electrolyte); Werth U.S. Pat. No. 3,877,984 ($SbCl_3$ cathode and $AlCl_3/NaCl$ (forming $NaAlCl_4$ during operation) electrolyte); Mamantov et al. U.S. Pat. No. 4,063,005 ($SCl_3+AlCl_4$ cathode and $AlCl_3/NaCl$ (forming $NaAlCl_4$ during operation) electrolyte); Auborn et al., Proc. 15th IECE Conference, 575 (1980) ($S_2Cl_2$ cathode operating similar to Mamantov); Newman et al. J. Electrochem. Soc., 127, 2097 (1980) ($TiS_2$ cathode and an organic solvent/sodium triethyl (N-pyrrolyl) borate electrolyte operating at room temperature with a solid Na anode); and Abraham et al. J. Electrochem. Soc., 127, 2545 (1980) (transition metal chalcogenide cathode and an organic solvent/inorganic salt (e.g., NaI) electrolyte). Tomczuk et al. J. Electrochem. Soc., 127, 1881 (1980) describes a cell having a lithium-aluminum alloy anode, a $TiS_2$ cathode, and LiCl/KCl as the Li+ ion conducting electrolyte. See also Vissers et al., J. Electrochem. Soc., 121, 665 (1974) ($FeS_2$ cathode, LiCl/KCl as the Li+ conducting electrolyte and Li anode); and Steunenberg et al., Proc. Electrode Materials and Processes for Energy Conversion and Storage, J. D. E. McIntyre and S. Srinivasan, Eds., The Electrochemical Society, Princeton, N.J. (1977) (Li, Li/Al alloy or Ca anode, transition metal sulfide cathode, LiCl/KCl as the Li+ conducting electrolyte).

SUMMARY OF THE INVENTION

In general, the invention features a cell having a housing containing a sodium anode assembly, a cathode assembly, and an electrolyte. The electrolyte is a sodium ion conducting alkali metal aluminum tetrahalide. The cathode material is a transition metal chalcogenide, or a reaction product of the chalcogenide and the electrolyte, and is disposed on a substrate in contact with the electrolyte. The transition metal is selected from groups IV B, V B, VI B, VII B, VIII, I B, and II B.

In some preferred embodiments, the cathode material is a mixture of a Na intercalating transition metal chalcogenide, preferably $VS_2$, and the reaction product of the chalcogenide and the electrolyte. In other preferred embodiments, the cathode material is a sodium intercalated transition metal chalcogenide (preferably, e.g., $NaVS_2$) or a transition metal chalcogen halide (preferably, e.g., $VS_2Cl_2$). In yet other preferred embodiments, the cathode materials comprise transition metal chalcogenides whose reduction with Na occurs in a displacement fashion; e.g., nickel disulfide ($NiS_2$), iron disulfide ($FeS_2$), or copper sulfide (CuS). The preferred electrolyte is $NaAlCl_4$.

The invention also features methods of increasing the capacity and potential of the cell. When the cathode material is a Na intercalating transition metal chalcogenide, the method involves activating the cell by heating to a temperature at which the sodium metal in the anode assembly and the electrolyte are liquid, closing the circuit and allowing a substantial discharge of the cell, allowing the cell to stand on open circuit while maintaining the temperature for a time interval sufficient to produce a higher capacity cell, and recharging the cell. When the cathode material is the reaction product, e.g., $NaVS_2$, the initial discharge step may be omitted. Alternatively, when the cathode material is the Na intercalating chalcogenide, the initial discharge is followed by an overdischarge of the cell and the step of allowing the cell to stand may be omitted.

Advantages of this cell include its capability to operate at a high capacity over a wide range of current density, yet at relatively low temperature and low vapor pressure.

Other advantages and features of the invention will be apparent from the following description of the preferred embodiments thereof, and from the claims.

DESCRIPTION OF THE PREFERRED EMBODIMENTS

We turn now to the description of the preferred embodiments after first briefly describing the drawings.

Drawings

STRUCTURE

Figure 1:
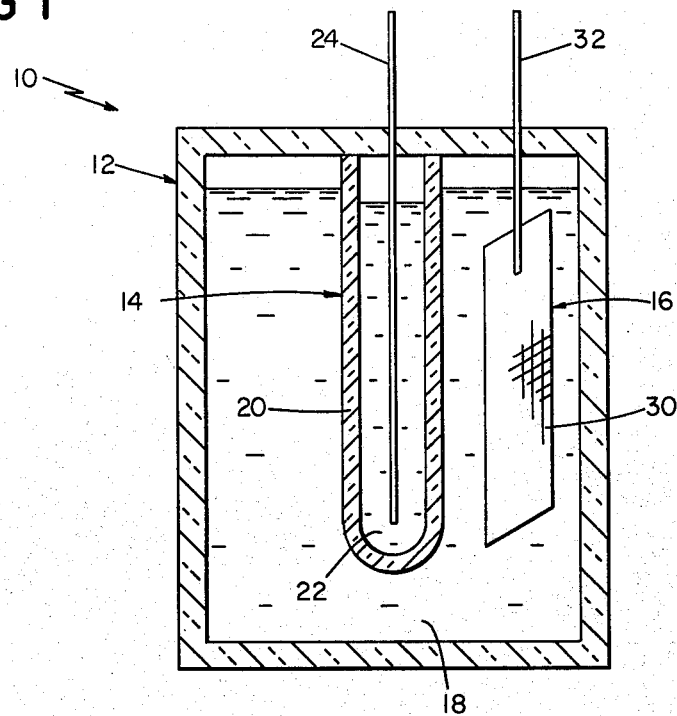
FIG. 1 is a somewhat schematic, cross-sectional view of a cell embodying the invention.

Referring to FIG. 1, electrochemical cell 10 has an outer housing 12 containing a sodium anode assembly 14, a cathode assembly 16, and electrolyte 18.

The anode assembly has a tube 20 (of sodium ion conducting material, preferably beta" alumina, $\beta''$-$Al_2O_3$) filled with sodium metal 22, and a tungsten wire current collector 24 extending from the sodium metal to the exterior of housing 10.

Cathode assembly 16 has a transition metal chalcogenide (preferably vanadium disulfide ($VS_2$), nickel disulfide ($NiS_2$), iron disulfide ($FeS_2$), or copper sulfide (CuS)) disposed on a substrate 30 in contact with electrolyte 18, and a tungsten wire current collector 32 extending to the exterior of housing 12.

Electrolyte 18 is a sodium ion conductor, preferably $NaAlCl_4$.

The initial electrochemical potential of this cell is slightly above 3 volts. The cell is activated by heating (preferably to between 165° and 220° C.) to convert the sodium metal and the $NaAlCl_4$ to a molten state, and discharged by closing the circuit while maintaining the temperature. Na+ ions from the sodium anode migrate through the beta alumina tube to react with the cathode.

The discharge reaction with $VS_2$ is described by the following equation:

$$e^- + Na^+ + VS_2 \rightleftharpoons NaVS_2 \qquad 1.$$

A substantial portion of the capacity of the cell is discharged, e.g., over 0.8 electrons per mole of $VS_2$ ($e^-/VS_2$). The cell is allowed to stand, e.g., for 75 hours, while maintaining temperature and with no current flowing, and, during that time, the open circuit voltage and the recharge capacity increase substantially.

Figure 2:
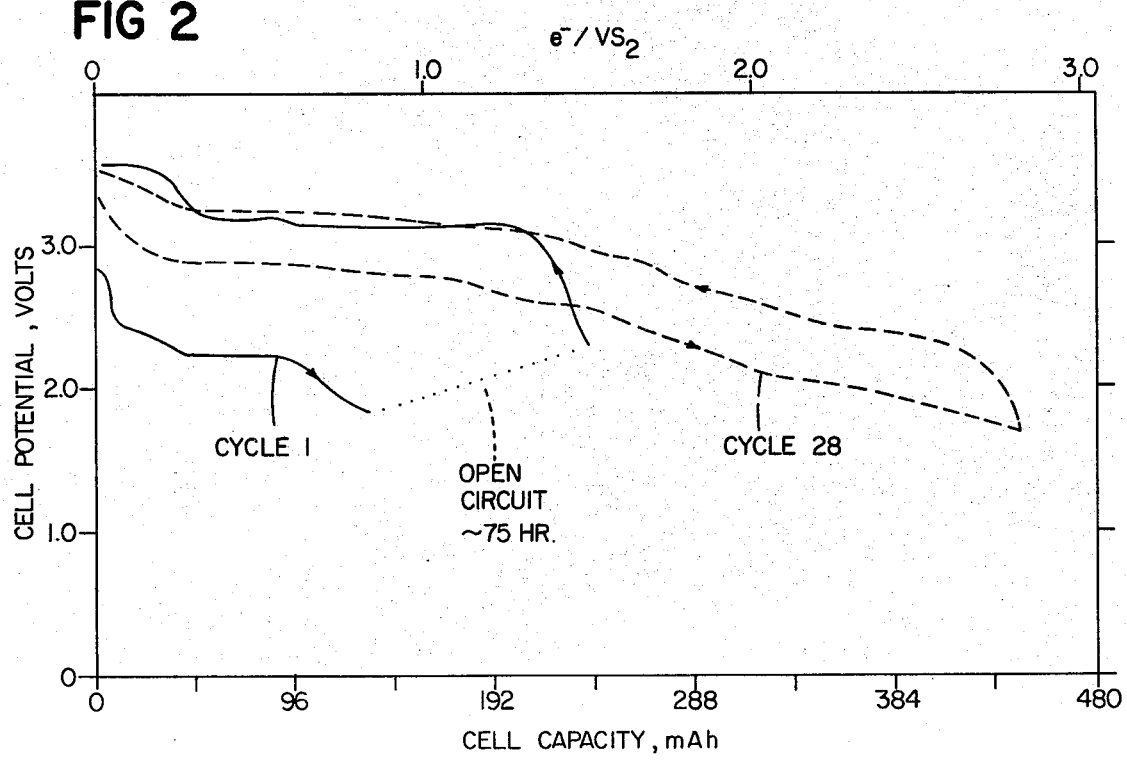
FIGS. 2 and 3 are graphical representations of charge and discharge cycles of cells embodying the invention.

The cell is then charged to a voltage above its original 3 volt potential, usually 3.6 volts, and again discharged. Upon this and further cycling, the cell potential and capacity continue to increase, reaching a steady state condition where the capacity is well above 1e−/VS$_2$ (e.g., averaging 2.7e−/VS$_2$ for extensive recycling). FIG. 2 shows the cell potential (in volts) and cell capacity (in mAh or e−/VS$_2$) during the first (solid line) and twenty-eighth (dashed line) cycles of the cell. The arrows to the right follow the discharge cycle and the arrows to the left follow the charge cycle. The dotted line on the first cycle indicates the open circuit stand method used to obtain the higher cell potential and capacity in later cycles. The increase in both the average discharge potential and the capacity is clearly illustrated in FIG. 2, which shows the capacity in the first and 28th cycles at 0.8 and 3.0e−/VS$_2$, respectively. These capacities correspond to quasitheoretical specific capacities of 353 Whr/kg and 1090 Whr/kg, respectively.

It is believed that the additional capacity is produced by the chemical reaction of NaAlCl$_4$ with NaVS$_2$ to form intermediates which (acting as cathode materials) further electrochemically react to form AlCl$_3$ and VS$_2$Cl$_2$ according to the following reactions:

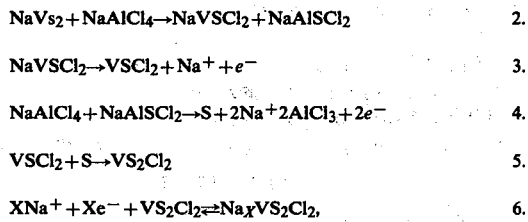

$$NaVs_2 + NaAlCl_4 \rightarrow NaVSCl_2 + NaAlSCl_2 \qquad 2.$$

$$NaVSCl_2 \rightarrow VSCl_2 + Na^+ + e^- \qquad 3.$$

$$NaAlCl_4 + NaAlSCl_2 \rightarrow S + 2Na^+ + 2AlCl_3 + 2e^- \qquad 4.$$

$$VSCl_2 + S \rightarrow VS_2Cl_2 \qquad 5.$$

$$XNa^+ + Xe^- + VS_2Cl_2 \rightleftharpoons Na_XVS_2Cl_2, \qquad 6.$$

where X is greater than or equal to 2.

This cell is capable of operating at a high capacity over a wide range of current density (mA/cm$^2$), yet at relatively low temperature and low vapor pressure.

In addition to VS$_2$, any other transition metal chalcogenides with the general formula MZy may be used, where M is a transition metal selected from Groups IV B, V B, or VI B of the Periodic Table (e.g., titanium (Ti), vanadium (V), or chromium (Cr), respectively), Z is a chalcogen selected from Group VI A of the Periodic Table (for example, sulfur (S) or selenium (Se)), and y has a value of 1, 2, or 3, or a fractional value between 1 and 3. Examples are TiS$_2$, ZrS$_2$, HfS$_2$, NbS$_2$, TaS$_2$, CrS$_2$, MoS$_2$, WS$_2$, VS, VS$_{1.5}$, VS$_{2.5}$, VSe$_2$, TiSe$_2$, CrSe$_2$, TiS$_3$, MoS$_3$, etc. These materials may be crystalline or amorphous.

Alternatively, in the case of the transition metals from Groups IV B, V B, or VI B, the cathode composition may be one of the reaction products formed in the operation of the cell.

Thus, the sodium intercalated transition metal chalocogenides, which have the general formula Na$_x$MZ$_y$, where x is between 0 and 1 inclusive, may be used in the cathode. Examples are NaVS$_2$, Na$_{0.8}$VS$_2$, Na$_{0.5}$VS$_2$, NaTiS$_2$, Na$_{0.5}$TiS$_2$, Na$_{0.8}$TiS$_2$, NaMoS$_3$, Na$_{0.5}$MoS$_3$, NaZrS$_2$, NaHfS$_2$, Na$_{0.6}$NbS$_2$, NaTaS$_2$, etc.

Alternatively, for Group IV B, V B, or VI B metals, the cathode composition can be the final product of the cell reaction described in equation 5, i.e., a transition metal chalcogen halide of the general formula MZ$_n$X$_m$, where each m and n, independently, is 2 or 3 and X is a halogen, e.g., chlorine. Examples are VS$_2$Cl$_2$, NbS$_2$Cl$_2$, TiS$_2$Cl$_2$, MoS$_2$Cl$_2$, MoS$_2$Cl$_3$, etc.

Alternatively, rather than employing one of the Group IV B, V B, or VI B metals, the cathode composition can be a transition metal chalcogenide, e.g. NiS$_2$, which undergoes discharge reactions in a displacement fashion as in equation 7:

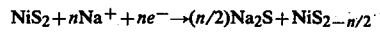

$$NiS_2 + nNa^+ + ne^- \rightarrow (n/2)Na_2S + NiS_{2-n/2}$$

The maximum value for n, which could be achieved in a full discharge of the cell, is 4. In less than full, i.e. partial, discharges n will have values, 0 < n < 4. In both cases, however, one of the discharge products is Na$_2$S. The other discharge product, when n = 4, is Ni. When 0 < n < 4, the discharge product, NiS$_{2-n/2}$, may consist of other phases of nickel sulfides with Ni to S atomic ratios between 0 and 2, depending upon the actual value of n. Some of those other discharge products are Ni$_3$S$_2$, NiS, and Ni$_7$S$_6$. The formation of these latter nickel sulfides is indicated by the potential steps seen in the discharge curve in FIG. 3.

Actual electrochemical cycling of the cell can be performed over one, or all of the potential steps.

This cell is capable of operating at a wide range of capacity, with a maximum capacity equivalent to 4e−/-NiS$_2$, and over a wide range of current density (mA/cm$^2$).

In addition to NiS$_2$, other transition metal chalcogenides with the general formula A$_u$D$_v$ may be used, where A is a transition metal selected from groups VII B, VIII, I B, or II B of the Periodic Table (e.g., manganese (Mn), iron (Fe), cobalt (Co), nickel (Ni), copper (Cu), or zinc (Zn) respectively), D is a chalcogen selected from group VI A of the Periodic Table (e.g., sulfur (S) or selenium (Se)), u has a value of 1 or 2 or a fractional value between 0 and 2, and v has a value of 1 or 2 or a fractional value between 0 and 2. Examples are CoS$_2$, FeS, FeS$_2$, CuS, ZnS, NiS, Ni$_7$S$_6$, NiS$_{0.85}$, Ni$_3$S$_4$, NiS$_{1.33}$, CuS, Ag$_2$S, CuSe, NiSe$_2$, NiSe, FeSe$_2$, etc.

The cathode compositions can also be a mixture of two or more of the above transition metal chalcogenides.

Alternatively, the cathode of the cell may initially contain the products formed in discharge of the cell as depicted in Equation 7. Thus, in other preferred embodiments employing group VII B, VIII, I B, or II B metals, the cathode may consist of any of those transition metals and a sodium chalcogenide, e.g. Na$_2$S or Na$_2$Se, taken in a molar ratio sufficient to produce a compound with the previously described formula of A$_u$D$_v$ upon charging the cell to a suitable potential. Obviously, when using this embodiment in which the cell is initially assembled in the discharged state, it is first necessary to charge the cell before it can be discharged and repeatedly cycled. The performance of a cell constructed with this cathode embodiment, e.g., Ni + Na$_2$S, is indistinguishable from that of a cell constructed in a charged state with the respective transition metal chalcogenide.

Further, the cathode compositions may include mixtures of the above.

The electrolyte can be any alkali metal aluminum tetrahalide having the general formula NaAlX$_4$, where X is a halogen, e.g., chlorine (Cl) or bromine (Br). It is important to have an excess of this material since it acts as both the electrolyte (Na$^+$ ion conductor) and as a reactant in the electrochemical reaction. Suitable proportions would be one mole of $MZ_y$ and two moles of $NaAlCl_4$.

The cathode assembly substrate may be made of any material which is chemically inert under the cell operating conditions. Examples are nickel mesh or carbon felt.

Further details of the preferred embodiments are found in the following examples.

EXAMPLE 1

An electrochemical cell was fabricated with a sodium anode and a tungsten (W) wire current collector, both contained inside a $\beta''$-$Al_2O_3$ tube 20. There was an excess of sodium in the tube and after initial discharge the level of the sodium was the same as the $VS_2$ cathode level. The outer housing 12 was constructed with pyrex glass. The cathode assembly 16 contained 0.65 grams (g) of crystalline $VS_2$ pressed onto an expanded nickel substrate 30 and placed around the $\beta''$-$Al_2O_3$ tube. Approximately 7 g of sodium tetrachloroaluminate ($NaAlCl_4$) was added as the electrolyte 18. The open-circuit-voltage (OCV) of the cell was 3.05 V at 165° C. The initial electrochemical discharge capacity of the cell was 128 mAh at a current density of 0.5 mA/cm$^2$ when discharged down to 1.8 volts. This capacity is equivalent to 0.8e$^-$/$VS_2$. The cell was then allowed to stand at 165° C. with no current flowing (i.e., open-circuit-stand). The voltage increased from 1.85 V to 2.25 V in about 75 hours and showed no further change. Charging of the cell up to 3.6 volts at a current density of 0.5 mA/cm$^2$ resulted in a capacity of 240 mAh, or 188% of the capacity of the first discharge.

The second discharge of the cell occurred at a higher average potential and had a capacity of 230 mAh or 1.5e$^-$/$VS_2$. Further cycling of the cell resulted in an additional increase in capacity.

EXAMPLE 2

Another electrochemical cell was fabricated by depositing 0.5 g of crystalline $VS_2$ on a carbon felt current collector which was secured around the outside of a $\beta''$-$Al_2O_3$ tube. The housing was then filled with 5 g of $NaAlCl_4$ electrolyte. A tungsten wire was used as the cathode terminal and the remainder of the cell was identical to that of the cell described in Example 1.

Unlike the cell in Example 1, this cell was not permitted to stand at 165° C. without current flowing after the initial discharge, but rather was cycled continuously. As in the cell described in Example 1, the high capacity of the cathode composition was realized in this cell. However, unlike the cell described in Example 1, the capacity of this cell increased gradually with cycling, requiring 8 cycles to increase from the initial discharge capacity of 0.60e$^-$/$VS_2$ to 2.7e$^-$/$VS_2$ in the 8th discharge. This gradual capacity increase is seen in Table 1, which tabulates the cycling data of the first 8 cycles of this cell.

TABLE 1

| Cycling Data for the Na/$VS_2$, $NaAlCl_4$ Cell in Example 2 | | | |
|---|---|---|---|
| | Discharge Capacity | | Charge Capacity |
| Cycle No. | mAh | e$^-$/$VS_2$ | mAh |
| 1 | 70 | 0.60 | 112 |
| 2 | 150 | 1.29 | 171 |
| 3 | 181 | 1.56 | 185 |
| 4 | 197 | 1.70 | 288 |
| 5 | 285 | 2.46 | 296 |
| 6 | 292 | 2.52 | 310 |
| 7 | 304 | 2.62 | 323 |

TABLE 1-continued

| Cycling Data for the Na/$VS_2$, $NaAlCl_4$ Cell in Example 2 | | | |
|---|---|---|---|
| | Discharge Capacity | | Charge Capacity |
| Cycle No. | mAh | e$^-$/$VS_2$ | mAh |
| 8 | 318 | 2.74 | 321 |

EXAMPLE 3

An electrochemical cell was assembled in the discharged state using 0.49 g of $NaVS_2$ and 10 g of $NaAlCl_4$. The cell design was the same as that described in Example 1. The initial OCV at 165° C. was 1.90 V. The OCV gradually increased to 2.30 V in about 75 hours, while the cell was allowed to stand at 165° C. without current flowing through the cell. The following charge of this cell was 125 mAh or 1.3e$^-$/$VS_2$ at a current density of 0.5 mA/cm$^2$ up to 3.60 volts.

The next discharge of the cell had a capacity of 186 mAh (1.9e$^-$/$VS_2$) down to 1.8 volts. Additional cycling of this cell resulted in a reversible capacity of greater than 250 mAh (2.6e$^-$/$VS_2$) by the fifth cycle.

EXAMPLE 4

The long term reversibility of the Na/$MZ_y$, $NaAlCl_4$ cells is demonstrated in this example. The cell was assembled in the discharged state using 0.40 g of $NaVS_2$ and 7 g of $NaAlCl_4$. The cell was assembled and operated at 170° C. in a manner identical to that described for the cell in Example 3. This cell yielded a maximum capacity equivalent to 3.5e$^-$/$VS_2$ in the 17th cycle. An average capacity of 2.7e$^-$/$VS_2$ was obtained over the 108 cycle lifetime of the cell at current densities of between 1 and 3 mA/cm$^2$.

EXAMPLE 5

Another electrochemical cell was fabricated in a manner identical to that described in Example 1, with 0.33 g of amorphous $VS_2$ pressed onto a nickel current collector and 8 g of $NaAlCl_4$. The cell had an OCV of 3.05 V at 165° C. The initial discharge of the cell at 0.75 mA/cm$^2$ current density yielded an electrochemical capacity of 96 mAh, (1.2e$^-$/$VS_2$) down to a 1.8 V cutoff. The first charge, immediately following the discharge, had a capacity of 190 mAh or 200% of the discharge. The second discharge was 199 mAh or 2.6e$^-$/$VS_2$ and occurred with a higher average discharge potential. The average capacity of this cell, over 50 cycles, was greater than 190 mAh (2.4e$^-$/$VS_2$).

EXAMPLE 6

Another electrochemical cell of the same construction as in the previous examples was assembled with 0.58 g of crystalline $TiS_2$ pressed on a nickel current collector and 8 g of $NaAlCl_4$. At 165° C. the OCV of the cell was 2.15 volts. The capacity of the first discharge was 67 mAh (0.5e$^-$/$TiS_2$) at a current density of 0.75 mA/cm$^2$ down to 1.7 volts. The cell was allowed to stand at 165° C. with no current flowing through it, and the voltage of the cell increased from 1.85 to 2.10 V in about 75 hrs. The electrochemical charging of the cell resulted in a charge acceptance of 249 mAh, or 400% of the discharge capacity, up to 3.6 volts. Further cycling of the cell showed it had a reversible capacity of approximately 300 mAh or 2.2e$^-$/$TiS_2$. This capacity was obtainable for more than 20 cycles before the cell was voluntarily terminated.

EXAMPLE 7

A cell was set up as in Example 1 with 0.513 g of $VS_2$ and 16.0 g of $NaAlCl_4$. At 165° C. it had an OCV of 3.12 V. The cell was initially cycled between voltage limits of 3.4 V and 1.8 V at a current density of 2 $mA/cm^2$. The data is tabulated in Table 2. The capacity in the first discharge was equivalent to $0.89e^-/VS_2$ and in the 10th discharge was equivalent to $1.27e^-/VS_2$. At the 11th discharge, the cell was overdischarged with the lower voltage limit set at 1.5 V. The cell was overdischarged with a charge utilization of 180 mAh. The 11th charge, following the 11th discharge, involved 322 mAh. In the 12th discharge, down to a 1.8 V cutoff, the capacity was 185 mAh ($1.54e^-/VS_2$) and in the 15th discharge the capacity was 288 mAh ($1.90e^-/VS_2$). The data show that the electrochemistry of the cathode compositions can be suitably manipulated to obtain higher electrical capacities.

TABLE 2

Cycling Data for the Na/$VS_2$, $NaAlCl_4$ Cell in Example 7

| Cycle No. | Discharge Capacity mAh | Charge Capacity mAh |
|---|---|---|
| 1 | 106 | 119 |
| 2 | 124 | 129 |
| 3 | 110 | 111 |
| 4 | 121 | 125 |
| 5 | 124 | — |
| 6 | 122 | 124 |
| 7 | 124 | 124 |
| 8 | 142 | 141 |
| 9 | 150 | 142 |
| 10 | 153 | 149 |
| 11 | 160[a] 32[b] 148[c] | 322 |
| 12 | 185 | 184 |
| 13 | 210 | — |
| 14 | — | 213 |
| 15 | 228 | 210 |

[a]Capacity to 1.8 V.
[b]Capacity between 1.8 V and 1.65 V.
[c]Capacity at the 1.62 V plateau.

EXAMPLE 8

A cell, as in Example 3, was fabricated with 0.611 g of $NaVS_2$ and 8 g of $NaAlCl_4$. After a capacity equivalent to $2.4e^-/VS_2$ was realized in the cell using the procedure of Example 3, the capacities of the cell were obtained at various current densities from 1 to 10 $mA/cm^2$. The data is tabulated in Table 3. The data show that the cathode composition is capable of high rate performances.

TABLE 3

Rate-Capacity Data for the Na/$VS_2$, $NaAlCl_4$ Cell in Example 8

| Discharge Current Density ($mA/cm^2$) | mAh | Capacity $e^-/VS_2$ |
|---|---|---|
| 1 | 286 | 2.4 |
| 2 | 297 | 2.5 |
| 3 | 309 | 2.6 |
| 6 | 330 | 2.8 |
| 8 | 321 | 2.7 |
| 10 | 286 | 2.4 |

EXAMPLE 9

A Na/$MoS_3$, $NaAlCl_4$ cell was fabricated with 0.59 g of $MoS_3$ as the transition metal chalcogenide cathode material pressed on a nickel current collector and 7 g of $NaAlCl_4$. The OCV was 2.76 V at 165° C. The overall construction of the cell was the same as in the previous examples. The cell had an initial discharge capacity equivalent to $1.3e^-/MoS_3$ down to a 1.8 V cutoff. The following charge of the cell, up to 3.4 V, resulted in no additional capacity. However, upon repeated galvanostatic cycling the capacity increased to $3.8e^-/MoS_3$. The high capacity of this cell remained fully reversible after more than 100 cycles.

EXAMPLE 10

An electrochemical cell containing 0.28 g of $NbS_2Cl_2$ deposited on a carbon felt current collector was assembled as described in Example 2. The OCV of the cell was 3.22 V at 165° C. The first discharge of the cell down to 1.8 V had a capacity of 67 mAh or $2.03e^-/NbS_2Cl_2$. The discharge occurred at a nearly constant potential of 1.95 V. The first charge of the cell up to 3.40 V resulted in a charge acceptance of 43 mAh or 64% of the initial discharge capacity.

The second and following discharges of the cell occurred in a sloping fashion with an average potential of 2.45 V and reversible capacities of $2.3e^-/NbS_2Cl_2$ in the 4th discharge and $2.7e^-/NbS_2Cl_2$ in the 6th discharge.

EXAMPLE 11

An electrochemical cell was constructed with 0.27 g $NiS_2$ embedded in 0.23 g carbon felt wrapped around the outside of the $\beta''$-$Al_2O_3$ tube. Approximately 5 g of $NaAlCl_4$ were added to its outer housing. The OCV of the cell was 3.07 V at 165° C. The overall construction of the cell was the same as in the previous examples. The electrochemical capacity of the initial discharge at a total current of 10 mA (~1 $mA/cm^2$) was 162 mAh to 1.8 V. This electrochemical capacity is equivalent to $2.7e^-/NiS_2$. The full electrochemical discharge capacity of the cell was recovered during the following galvanostatic charge to 3.5 V. Further cycling of the cell at a current of 10 mA between 1.8 and 3.5 V resulted in a reversible electrochemical capacity equivalent to $3e^-/NiS_2$. The cycling data of the first 20 cycles are shown in Table 4. The mid-discharge potential was 2.4 V. The energy density corresponding to the $3e^-/NiS_2$ capacity and the 2.4 V mid-discharge potential is 1006 Wh/kg.

EXAMPLE 12

Figure 3:
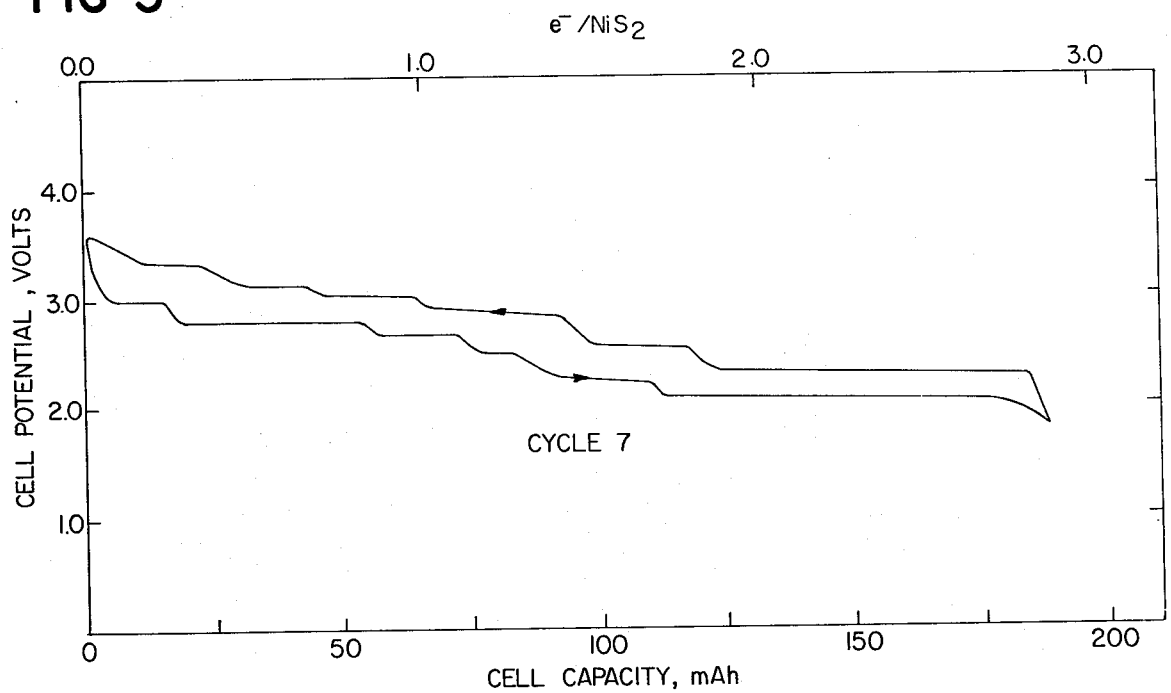

Another electrochemical cell was fabricated with 0.30 gm of $NiS_2$ pressed onto an expanded nickel substrate located around the outside of the $\beta''$-$Al_2O_3$ tube. The outer housing was filled with 1.40 gm of $NaAlCl_4$ electrolyte. The OCV of the cell was 3.05 at 165° C. The overall construction of the cell was the same as in the previous examples. The cell yielded a reversible electrochemical capacity equivalent to $2.8e^-/NiS_2$ at a current density of 1.3 $mA/cm^2$ and to $3.4e^-/NiS_2$ at 0.5 $mA/cm^2$. The voltage profiles of the seventh galvanostatic cycle obtained at a current density of 1.3 $mA/cm^2$ is shown in FIG. 3. The energy density corresponding to the 7th discharge is 974 Wh/kg.

EXAMPLE 13

An electrochemical cell was assembled in the discharged state by using an intimate mixture of 0.15 gm of Ni powder and 0.40 gm of $Na_2S$ dispersed an 0.20 gm of carbon felt. The carbon felt was placed around the outside of the $\beta''$-$Al_2O_3$ tube. 7.0 gm of the $NaAlCl_4$ electrolyte were added into the outer housing. The remainder of the cell was identical to the one described in Example 11.

The initial OCV of the cell was 2.20 V at 165° C. The electrochemical capacity of the initial charge to 3.5 V at 10 mA (~1.5 mA/cm$^2$) was 2.33 mAh. This capacity is equivalent to 3.4e$^-$/Ni. The next discharge of the cell had an electrochemical capacity of 240 mAh (3.5e$^-$/Ni) to 1.8 V. The electrochemical behavior of the cell was indistinguishable from that of the Na/NiS$_2$, NaAlCl$_4$ cell in Example 12, constructed in the charged state. The cycling data of the cell are presented in Table 5.

EXAMPLE 14

Another electrochemical cell was constructed with an intimate mixture of 0.40 gm of NiS$_2$ and 0.04 gm of Ni metal dispersed in a carbon felt current collector.

TABLE 4

Cycling Data for the Na/NiS$_2$, NaAlCl$_4$ Cell in Example 11
Current Density: Cycles 1–9, 1 mA/cm$^2$; Cycles 10–17,
2 mA/cm$^2$; Cycles 18–20, 1 mA/cm$^2$.

| Cycle Number | Discharge Capacity (mAh) | Charge Capacity (mAh) |
|---|---|---|
| 1 | 162 | 169 |
| 2 | 179 | 181 |
| 3 | 178 | — |
| 4 | 178 | 178 |
| 5 | 182 | 180 |
| 6 | 181 | 176 |
| 7 | 180 | 180 |
| 8 | 184 | 181 |
| 9 | 183 | 181 |
| 10 | 168 | 162 |
| 11 | 162 | 162 |
| 12 | 166 | 164 |
| 13 | 163 | 162 |
| 14 | 163 | 163 |
| 15 | 160 | 156 |
| 16 | 158 | 156 |
| 17 | 156 | 158 |
| 18 | 169 | 170 |
| 19 | 169 | 170 |
| 20 | 185 | 180 |

The remainder of the cell was assembled as described in Example 11. The OCV of the cell was 3.10 V at 165° C. The initial discharge of the cell to 1.8 V yielded a capacity equivalent to 3.0e$^-$/NiS$_2$. The full electrochemical capacity was recovered when charged to 3.4 V. Further galvanostatic cycling between 3.4 and 1.8 V resulted in a reversible electrochemical capacity equivalent to 3.7e$^-$/NiS$_2$. The voltage profiles of this cell displayed the same voltage plateaus as seen in cells described in Examples 1 to 3. The cycling data of the initial 21 cycles of the cell are presented in Table 6.

EXAMPLE 15

An electrochemical cell containing 0.21 gm CuS deposited on a carbon felt current collector was assembled as described in Example 11. The OCV of the cell was 3.25 V at 165° C. The initial discharge of the cell had a capacity of 65 mAh or 1.1e$^-$/CuS at a current density of ~1.7 mA/cm$^2$. At a current density of 0.3 mA/cm$^2$ the electrochemical capacity of the cell was a higher 1.75e$^-$/CuS. The discharge occurred in a series of voltage steps between 3.2 to 1.8 with an average potential of 3.0 V. The energy density corresponding to 1.7e$^-$/CuS with 3.0 V is 1036 Wh/kg.

TABLE 5

Cycling Date of the Na/Na$_2$S + Ni, NaAlCl$_4$ Cell in Example 13

| Cycle Number | Discharge Capacity (mAh) | Charge Capacity (mAh) |
|---|---|---|
| 0 (initial charging) | — | 233 |
| 1 | 240 | 248 |
| 2 | 248 | 255 |
| 3 | 248 | 258 |
| 4 | 253 | 251 |
| 5 | 250 | 250 |
| 6 | 247 | 247 |
| 7 | 247 | 244 |
| 8 | 238 | 240 |
| 9 | 237 | 233 |

TABLE 6

Cycling Data of the Na/NiS$_2$, NaAlCl$_4$ Cell in Example 14

| Cycle Number | Discharge Capacity (mAh) | Charge Capacity (mAh) |
|---|---|---|
| 1 | 245 | 290 |
| 2 | 325 | 300 |
| 3 | 325 | 330 |
| 4 | 322 | 330 |
| 5 | 280 | 260 |
| 6 | 260 | 270 |
| 7 | 270 | 270 |
| 8 | 260 | 260 |
| 9 | 260 | 260 |
| 10 | 250 | 255 |
| 11 | 240 | 245 |
| 12 | 245 | 245 |
| 13 | 240 | 240 |
| 14 | 235 | 240 |
| 15 | 235 | 240 |
| 16 | 235 | 235 |
| 17 | 230 | 240 |
| 18 | 230 | 235 |
| 19 | 230 | 225 |
| 20 | 220 | 220 |
| 21 | 225 | 225 |

EXAMPLE 16

A Na/FeS$_2$, NaAlCl$_4$ cell was fabricated with 0.22 gm of FeS$_2$ disposed on a carbon felt current collector. The overall construction of the cell was the same as described in Example 11. The OCV of the cell was 2.72 V at 165° C. The initial discharge capacity of the cell was equivalent to 1.8e$^-$/FeS$_2$ at a current density of 1.7 mA/cm$^2$. Further cycling of the cell at a current density of 1.7 mA/cm$^2$ resulted in a reversible capacity of ~3e$^-$/FeS$_2$. At a current density of 0.3 mA/cm$^2$ the discharge capacity of the cell was equivalent to 3.6e$^-$/FeS$_2$ and the mid-discharge voltage was 2.55 V. The corresponding energy density is 1213 Wh/kg.

Other embodiments are within the following claims.

We claim:

1. In an electrochemical cell comprising a housing containing a sodium anode assembly, a cathode assembly, and an electrolyte, the improvement wherein;
    said electrolyte comprises a sodium ion conducting alkali metal aluminum tetrahalide, and;
    said cathode assembly assembly comprises a transition metal chalcogenide, or a reaction product of said chalcogenide and said electrolyte, disposed on a substrate in contact with said electrolyte, said transition metal being selected from one of groups IV B, V B, VI B, VII B, VIII, IB, and II B in the periodic table,
    wherein said anode assembly comprises a tube of sodium ion conducting material filled with sodium metal in an amount such that the level of sodium metal is no less than the level of said transition metal chalcogenide after the first discharge of said cell, said sodium metal being molten in operation, and a wire current collector extending from said sodium metal to the exterior of said housing.

2. The cell of claim 1, wherein said transition metal chalcogenide has the formula $MZ_y$, where M is a transition metal selected from one of groups IV B, V B, or VI B of the periodic table, Z is a chalcogen selected from group VI A of the periodic table, and y is a whole or fractional number between 1 and 3, inclusive.

3. The cell of claim 1, wherein said reaction product comprises a sodium intercalated transition metal chalcogenide or a transition metal chalcogen halide.

4. The cell of claim 1, wherein said transition metal chalcogenide comprises vanadium disulfide.

5. The cell of claim 1, wherein said reaction product comprises $NaVS_2$ or $VS_2Cl_2$.

6. The cell of claim 1, wherein said electrolyte comprises $NaAlCl_4$.

7. The cell of claim 1, wherein said transition metal chalcogenide has the formula $A_uD_v$, where A is a transition metal selected from one of the groups VII B, VIII, I B, and II B of the periodic table, D is a chalcogen selected from group VI A of the periodic table, u is a whole or fractional number greater than 0 and less than or equal to 2, and v is a whole or fractional number greater than 0 and less than or equal to 2.

8. The cell of claim 7 wherein said transition metal chalcogenide comprises at least one of $NiS_2$, $FeS_2$, or CuS.

9. The cell of claim 7 wherein said transition metal chalcogenide is formed upon charging a previously uncharged cell in which the cathode comprises said transition metal and a sodium chalcogenide in a molar ratio sufficient to produce said $A_uD_v$ upon charging.

10. In an electrochemical cell comprising a housing containing a sodium anode assembly, a cathode assembly, and an electrolyte, the improvement wherein;

said electrolyte comprises a sodium ion conducting alkali metal aluminum tetrahalide, and said electrolyte being molten in operation, and;

said cathode assembly assembly comprises a transition metal chalcogenide, or a reaction product of said chalcogenide and said electrolyte, disposed on a substrate in contact with said electrolyte, said transition metal being selected from one of groups IV B, V B, VI B, VII B, VIII, IB, and II B in the periodic table, said tetrahalide electrolyte being present in an amount in excess of that required for its electrolyte function, to permit a reaction between said chalcogenide and said excess tetrahalide, increasing the capacity of said cell.

* * * * *